Dec. 17, 1940. H. J. DE N. McCOLLUM 2,225,315
INERTIA ACTUATED VALVE DEVICE
Filed Dec. 3, 1932 3 Sheets-Sheet 1
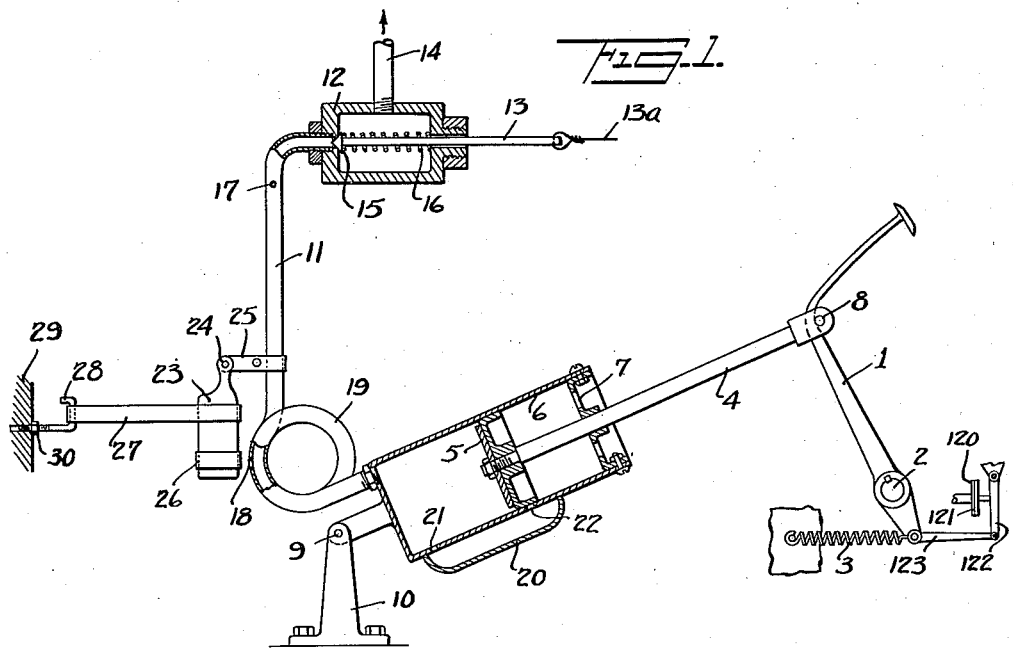
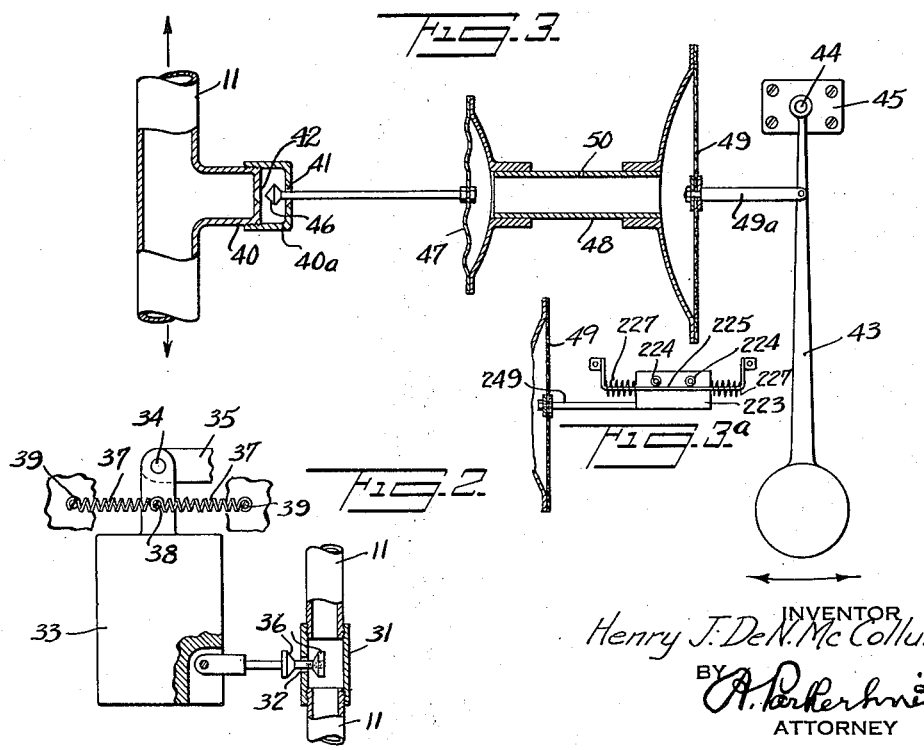
INVENTOR
Henry J. DeN. McCollum
BY
ATTORNEY

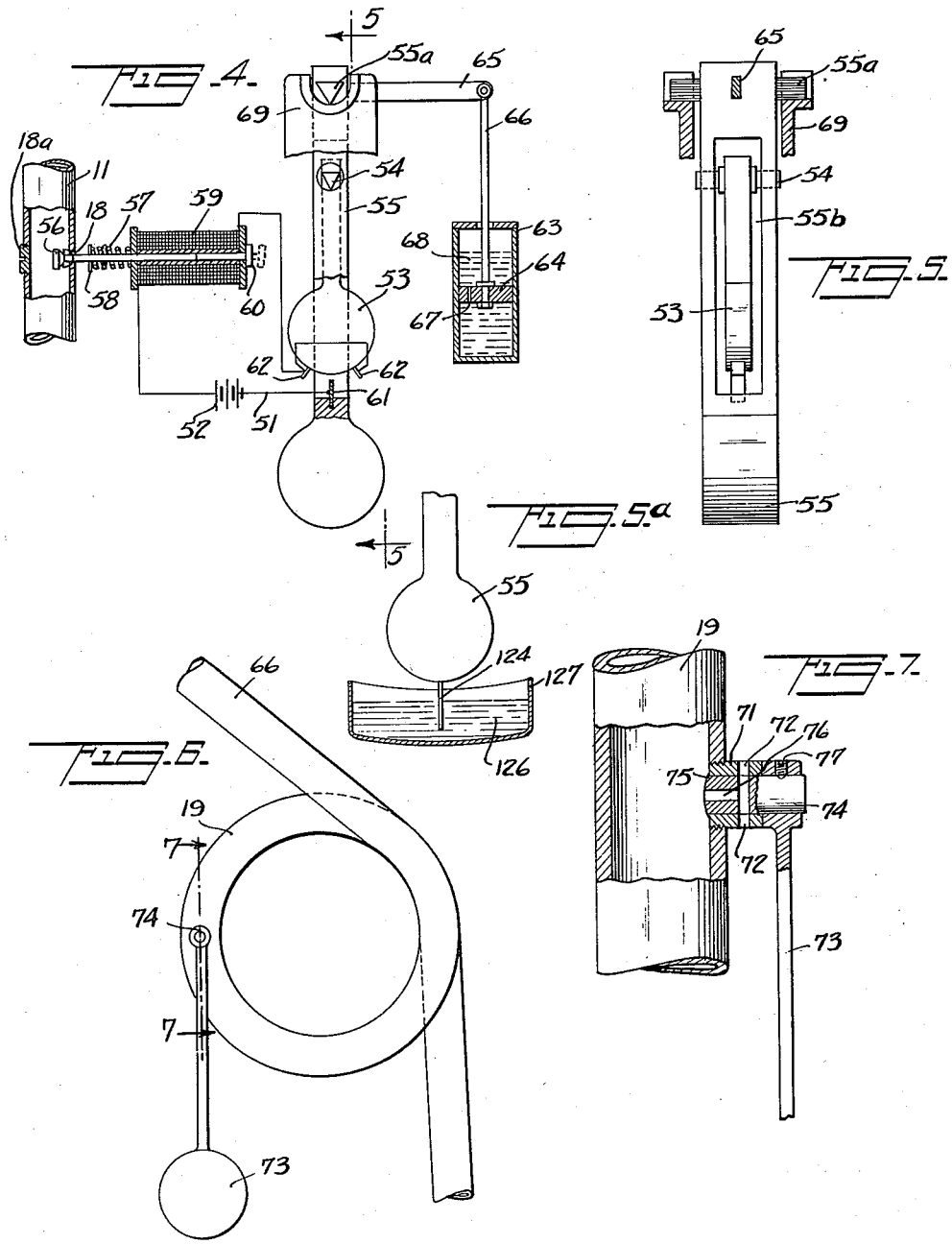

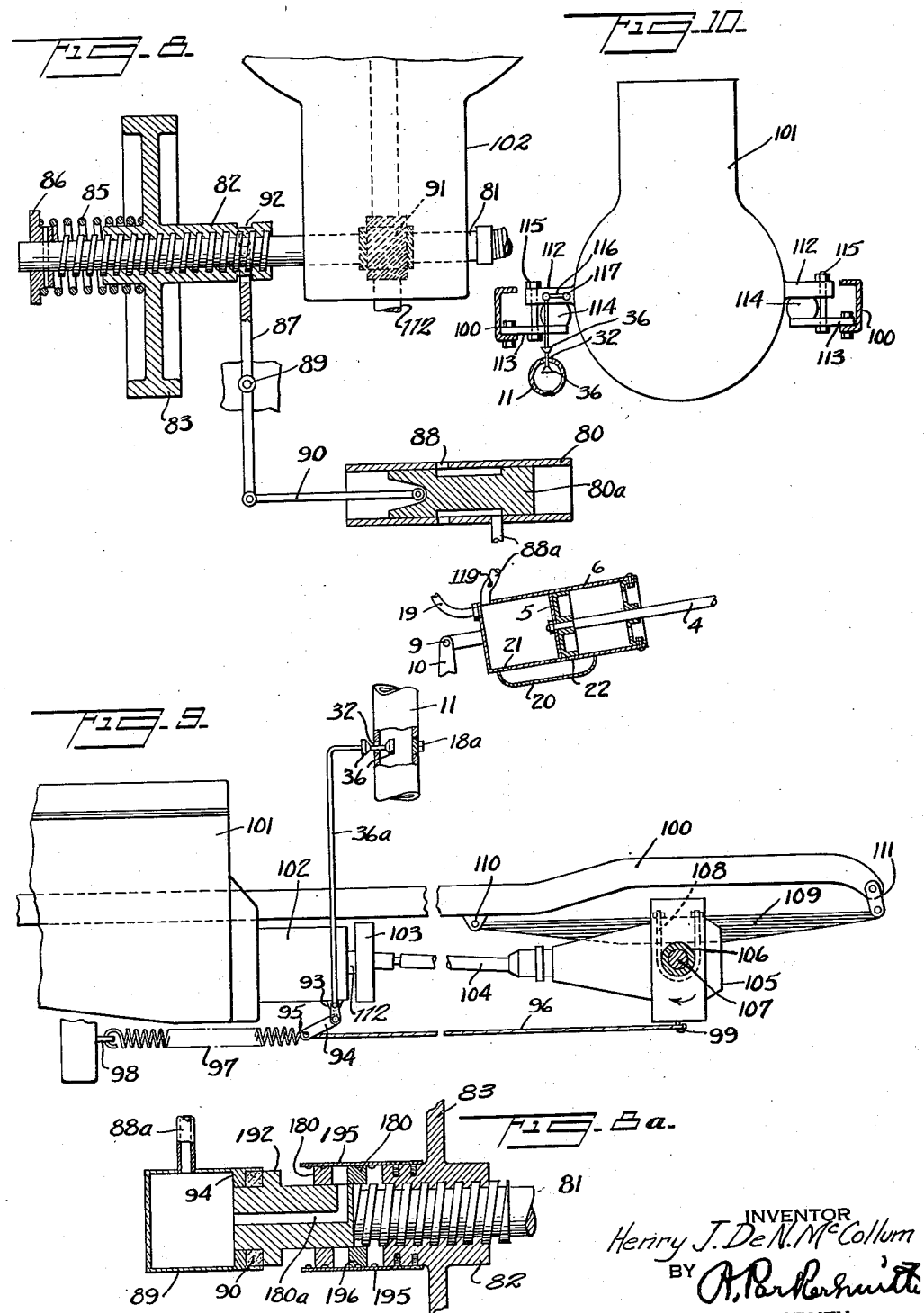

Patented Dec. 17, 1940

2,225,315

UNITED STATES PATENT OFFICE 2,225,315

INERTIA ACTUATED VALVE DEVICE

Henry J. De N. McCollum, Elberon, N. J.

Application December 3, 1932, Serial No. 645,576

20 Claims. (Cl. 192—.01)

This invention relates generally to valve apparatus mounted on movable supports and actuated by the inertia of certain loosely suspended or supported masses, or by the inertia of certain portions of such movable supports, but more particularly it is designed to produce an automatically operated valve apparatus for installation on motor cars which will act to check the closing or engaging movement of the power transmission clutch whenever the car begins to move, or when and while its motion is being sharply accelerated, as when changing from second to third or to any higher gear.

The main object of the invention is to enable the automatic, power-operated clutch-actuating devices now coming into quite general use to produce the desired clutch engagement without "grabbing" and "jumping" of the clutch parts when starting the car from a position of rest, or when stepping up from one gear to another in getting the car under full speed, and thus avoiding any jerking of the car forward or backward suddenly which would produce discomfort of the occupants and straining of the car mechanism.

A further object of the invention is to perfect or further improve the action or effect during clutch engagement first above described heretofore produced by the various forms of automatic "two-stage," clutch closing mechanism heretofore devised and designed to secure the above outlined results, a number of which mechanisms are shown in, and described in, the co-pending application Ser. No. 509,310 filed by James H. K. McCollum and myself under date of January 17, 1931, now Patent No. 2,219,269 of October 22, 1940, No. 516,368 filed February 17, 1931, now Patent No. 1,952,767 of March 27, 1934, No. 587,880 filed January 21, 1932, now Patent No. 2,181,491 of November 28, 1939, and in my copending application No. 594,802 filed February 24, 1932, now Patent No. 1,938,080, of December 5, 1933.

In such previously illustrated apparatus of the type above outlined the clutch actuating or controlling lever or other member is permitted to move rapidly during the first portion of its clutch closing movement, and then, at or about the time the clutch members reach their initial contact of engagement, this rate of motion is automatically slowed down, and thereafter continues at a slower speed till complete clutch closure has been effected. I have found, however, that such a uniform reduction of speed of motion of clutch parts is not sufficient to remove all jerks, or "grabbing" of the clutch surfaces, in all cases, and I have further discovered that what is needed to produce perfect smoothness of clutch engagement for a motor car is the addition of some mechanism which will practically stop the movement of the clutch controlling lever or member at the moment when initial clutch engagement has produced sufficient friction to start, or further accelerate, the motion of the car, or as soon thereafter as possible, and subsequently, when the car motion has been sufficiently accelerated, permit the clutch closing movement of such clutch lever to be slowly completed.

If an apparatus for this purpose could be devised which would act when, and only when, the movement of the car is begun, or is sharply accelerated, the result desired would be achieved, and I have discovered that just that can be accomplished by utilizing the inertia of a mass loosely supported on the car, or that of a portion of the car itself not rigidly connected to its traction apparatus, to operate a "bleed" or "leakage" valve for a pneumatic clutch actuating apparatus equipped with any one of the "two-stage" control devices now going into general use. The last mentioned type of pneumatic apparatus comprises a cylinder and piston, or air chamber with a flexible diaphragm therein, and the movement of the piston or diaphragm is checked (at or about the time the initial clutch engagement occurs) by shutting off the free flow of air to or from such cylinder or chamber, and thereafter permitting only a restricted inflow or outflow through a small "leakage" port or "bleed" connection. If, then, the opening and closing of such bleed port or connection is controlled and effected by the inertia of a mass which must be eventually put in motion, or accelerated in motion, as a result of this initial clutch closure, and such bleed or leakage port is thereby closed at that moment, the movement of the piston or diaphragm will be stopped, instead of merely slowed down, at that moment, and will be resumed at the slower speed of the second of the "two-stage" rates of movement after the inertia of the loosely supported mass has been overcome by the springs provided for that purpose, or by gravity, so that it resumes its normal position with reference to other portions of the car.

I have devised three types of apparatus for carrying out my invention, as follows: (1) a pendulum type, in which a pendulum carried by the car lags and swings back as the car starts or accelerates, and thereby closes the bleed or leakage port temporarily; (2) a fly wheel, spring driven from the car transmission, which similarly lags and closes the bleed valve the moment the motor starts, or begins to accelerate and (3) a torque operated bleed valve which is closed whenever power is applied to the tractor wheels of the car by the motor, or such power is sharply increased in torque producing effect, with the result that the inertia of the car body creates a sudden torque, or sudden increase of torque, on the axle housing, or on the floating motor, which torque or increase thereof flexes the supporting springs and produces the slight relative motion needed to close, or partly close, the bleed valve. The best forms of apparatus, at present known to me, embodying the above outlined modifications of my invention, are illustrated in the accompanying three sheets of drawings in which:

Fig. 1 is a diagrammatic side elevation of the pneumatic clutch actuating mechanism with the pendulum form of my invention applied thereto.

Fig. 2 shows a modification in which the bleed controlling valve is double acting.

Fig. 3 shows a similar form equipped with means for permitting automatic adjustment of the parts when the car is standing or running on an incline, and Fig. 3a shows a sliding weight acting like a pendulum.

Fig. 4 is a side elevation and partial section of another form of automatic adjusting apparatus, and Fig. 5 is a vertical section thereof taken on line 5—5 of Fig. 4.

Fig. 5a shows a slight modification of the form shown in Figs. 4 and 5.

Fig. 6 is a detail side view of another form of pendulum apparatus, and

Fig. 7 is an enlarged detail partly shown in section taken on line 7—7 of Fig. 6.

Fig. 8 is a diagrammatic view partly in section of the fly wheel type of embodiment of my invention, and Fig. 8a shows a simpler form thereof.

Fig. 9 is a diagrammatic view partly in section of the third form of my invention in which the inertia of the car itself, acting through the torque between rear axle and axle housing, operates the bleed valve, and Fig. 10 is a diagrammatic front elevation of a motor with the chassis shown in cross section, in which the motor mounting is a simple form of the "floating power" type, and the movement of the motor produced by variations in its torque operates the bleed valve.

Throughout the drawings like reference characters indicate like parts.

Referring to Fig. 1, a simple clutch for motor cars is there diagrammatically illustrated, 120 representing the driving disk on the end of the motor shaft, 121 representing the driven disk connected to the transmission mechanism, 122 representing the lever by which disk 121 is shifted into or out of engagement with disk 120, and 123 representing the link connecting lever 122 with the clutch actuating lever 1, which is mounted on the shaft 2. The system of springs by which the clutch is normally held in engagement, and the lever 1 swung in a clockwise direction, is represented at 3. A pneumatic servomotor for opening and closing the clutch is illustrated as being composed of a cylinder 6 containing a piston 5 with a piston rod 4 extending through the skeleton cylinder head 7 and pivoted at 8 to the clutch lever 1. Cylinder 6 is pivoted at 9 to any convenient bracket 10 carried by the chassis. 11 is a piece of flexible copper tubing connecting the closed end of cylinder 6 with the interior of the valve casing 12, said valve casing also being connected by pipe 14 to the intake manifold of the motor (not shown). The poppet valve 15 is normally held by compression spring 16 against the port to which pipe 11 is connected, but has its stem 13 connected by wire 13a to the accelerator pedal of the car (not shown), the parts being so proportioned that during the last portion of the movement of said accelerator pedal, when the operator takes his foot off of it, the wire 13a is put under tension and pulls valve 15 away from its seat so as to complete communication through pipes 11 and 14 to the intake manifold from the interior of cylinder 6.

21 and 22 are small ports in the wall of cylinder 6 connected together by the by-pass conduit 20. As a result, when the valve 15 is closed and the intake manifold suction is thereby shut off, the clutch springs 3 will swing lever 1 in a clockwise direction and pull piston 5 from the closed end of cylinder 6 toward the open end thereof, and during the first portion of the travel of said piston air will flow freely through the skeleton cylinder head 7, port 22, by-pass conduit 20 and port 21, to the cylinder space behind the piston 5 and, as air can also flow into pipe 11 through the port 18 in the wall thereof and through the very small leakage port 17, the piston travels rapidly to the right until it closes the port 22, the parts being so adjusted that at or about that moment the clutch plates 120 and 121 make sufficiently close contact one with another to start the car, all as shown in Fig. 1.

At the end of this first stage of the clutch closing movement no more air can pass through port 21 to the space behind piston 5 and air can enter that space only slowly as it is drawn in through ports 18 and 17. As a result the second stage of movement of the lower lever 1 under the influence of spring 3 is much slower than the first stage and the amount of such motion necessary to put the plates 120 and 121, and the connections 122 and 123, under the full state of strain which is necessary to produce the friction required to prevent slipping of the clutch when the motor is operating at its full capacity is spread over an appreciable interval of time, during which the motion of the car can be quite rapidly accelerated without the clutch plates grabbing and jumping. The two-stage action last above described is such as is produced by the apparatus of the co-pending applications above mentioned, and the two-stage feature in the present case is produced by use of the by-pass through 22, 20 and 21. The present invention may be advantageously added to such two-stage apparatus to further improve the two-stage operation, or may be employed alone to produce a two-stage operation by itself, and the form of the said present invention illustrated in Fig. 1 will now be described and its operation explained.

The pipe 11 is usually given a convolution of one coil 19 to facilitate the slight swinging motion of cylinder 6 on its pivot 9, and the convex surface of such coil forms a convenient location for the leakage port 18 in the wall thereof so that the pad of chamois or other soft material 26 carried by the swinging weight or pendulum 23 may be pressed against the edges of port 18 whenever weight 23 swings toward and against the adjacent surface of the coil 19. Pendulum 23 swings from pivot 24 carried by bracket 25 clamped to an upper portion of the pipe 11, and its center of gravity is located at one side of a vertical line passing through pivot 24, when the pendulum is in the position shown in Fig. 1, and said pendulum is held in that position by slight tension of the rubber band 27 which passes around the anchor hook 28 screwed into any convenient anchorage 29 and held in any desired position of adjustment by the locknut 30. When, however, the piston 5 has reached a position closing port 22, as indicated in Fig. 1, and the clutch plates 120 and 121 have made their initial contact, as there indicated, the car will begin to move, carrying bracket 25 with it toward the left, whereupon the inertia of pendulum 23 will cause it to lag behind the motion of the pivot 24 and further distend rubber band 27 until said pendulum has swung far enough to cause the pad of chamois 26 to be forced against port 18 and close the same. Thereupon no more air can enter cylinder 6, except the very small quantity flowing through the minute leakage port 17 (if such a leakage port is employed), and consequently the previously rapid movements of piston 5 and lever 1 are practically arrested, and no further movement of the clutch plate 121 occurs until the force of gravity acting on pendulum 23 has begun to swing it back towards its normal position shown in Fig. 1, thereby opening the leakage port 18 and permitting the piston 5 to slowly complete the second stage of its movement and allow clutch springs 3 to put the clutch connections under strains sufficient to cause frictional engagement between the clutch plates which will prevent them slipping, even when the motor is delivering its maximum power.

It is to be understood, of course, that ports 17, 18, 21 and 22 must be sufficiently restricted in area to enable the suction of the intake manifold, when valve 15 is pulled to the right, to move the piston 5 to the closed end of cylinder 6 and open the clutch fully, overcoming the resistance of clutch springs 3.

The apparatus thus shown in Fig. 1 will operate whenever the car is started forward by putting the transmission gearing into first speed, or when its motion is further accelerated by shifting from first to second or second to third or any higher gear, but it will not operate when the gear is in reverse. To prevent clutch grabbing or jumping when the car is being run backward a double acting bleed valve 36, 36, should be employed such as illustrated diagrammatically in Fig. 2. The bleed port 32 is then formed in a short coupling sleeve 31 inserted between two sections of the pipe 11, and said valve is pivotally connected to the pendulum 33 swung from pivot 34 on bracket 35. In place of the rubber band 27 shown in Fig. 1, opposed helical springs 37, 37 are shown anchored at points 39, 39, and connected to pendulum 33 by the screw 38. The inner valve 36 may be screwed on the stem after the coupling 31 has been disconnected from one of the pipe sections 11 and the end of the valve stem has been inserted through port 32.

If either of the sets of apparatus above described is adjusted for satisfactory operation on a level stretch of road, I have found that it will not operate satisfactorily when the car is standing on, or going up or down, a sharp grade and to overcome this difficulty some automatic self adjusting mechanism must be provided for devices of this pendulum type, such for instance as that illustrated in Fig. 3. In this apparatus the single valve 46 has a double action by reason of its being located between the port 42 in the end of the nipple 40, extending from the pipe 11, and the port 41 in the cap 40a screwed into the end of nipple 40, and this valve is connected to the corrugated metal diaphragm 47 mounted on one end of the casing 48. At the other end of this casing a cloth diaphragm 49, preferably of larger area, is connected by link 49a to pendulum 43 suspended from pivot 44 on fixed bracket 45. If the air or other fluid contained in casing 48 is substantially confined therein it is evident that vibrations of the pendulum 43 will cause a flexing of diaphragm 49 which will be reproduced in diaphragm 47 to even greater extent, on account of the lesser diameter of the latter diaphragm, and that consequently valve 46 will close either port 41 or 42, according to the direction in which pendulum 43 swings, when the car is started forward or backward, and that the bleed inlet to pipe 11 will accordingly be instantly closed, with a result such as described with reference to Figs. 1 and 2. The metal diaphragm 47 is less flexible than cloth diaphragm 49 and normally tends to stay in the mid position shown in Fig. 3 so that air may flow in succession through ports 41 and 42 to the interior of pipe 11. If the car starts to climb a hill or descend one the diaphragm 49 will be slowly flexed in one direction or another, but so slowly that the necessary amount of air may leak in or out through the very small port 50 before the change in the tension of the trapped air has become sufficient to flex diaphragm 47, and if said diaphragm is temporarily flexed while the car is running it doesn't matter, as the clutch is then continuously engaged. Consequently valve 46 will remain in neutral position while the car is climbing the hill or descending a grade and the necessary readjustment will occur reversely when the car straightens out on the level. If at any time, however, while the car is on a hill or on the level it is started from rest to motion or sharply accelerated in speed of motion, either forward or backward, the sudden resultant swing of pendulum 43 will cause a sudden change in the tension of the air trapped in casing 48 which cannot be absorbed by inflow or outflow of air through port 50 and accordingly diaphragm 47 will be momentarily flexed sufficiently to seat the valve 46 in either port 41 or 42 and thus close the bleed opening to pipe 11 until pendulum 43 returns to a vertical position, or the tension of the air in casing 48 equalizes with that of the external atmosphere, whereupon valve 46 will return to neutral or mid position shown in Fig. 3. In either case the period during which the clutch closing movement should be arrested, will have elapsed.

A self adjusting valve mechanism of this type could be operated by a sliding weight instead of a pendulum, as diagrammatically illustrated in Fig. 3a, where weight 223 slides on horizontal rod 225, supported on the chassis. Opposed springs 227, 227 hold weight 223 in mid position, but it slides one way or the other as the car suddenly accelerates or decelerates, starts or stops, and then flexes a diaphragm like 49, connected to it by link 249. Weight 223 should be hung on anti-friction bearings 224, 224.

Another idea of means for accomplishing this automatic self adjustment of the pendulum-operated apparatus when the car runs onto or off of a grade in the roadway is illustrated in Figs. 4 and 5. In this apparatus the valve 56 controls the bleed port 18 and its stem projects into the solenoid 59 serving as a movable core therefor. 63 is a non-magnetic extension of the valve stem which acts as a stop to limit the inward motion of the valve under the urge of compression spring 57 confined between the end of the solenoid spool and the cross pin 58 mounted in said valve stem. If the portion 60 were of iron or other magnetic material, the same as is the valve stem, the magnetic pull of the solenoid 59 would have little, if any, effect in moving said valve stem to the right so as to close the valve port 18. If, however, the extension 60, which like the valve stem is slidable through the center of the solenoid, be made of non-magnetic material as above described, the effective pull of the solenoid on the magnetic valve stem is very considerable. If, on the other hand, the non-magnetic extension 60 with its enlarged outer end were omitted, the valve 56 would be opened too widely by the action of the spring 57 which would then continue to expand until the pin 58 came to a rest against the pipe 11. The closed positions of the valve and of the extension 60 are indicated in dotted lines. 18a is a removable plug in the wall of pipe 11 opposite bleed port 18 which may be removed to permit valve 56 to be shoved into position through said pipe. 51 is the solenoid circuit including a source of electricity conventionally indicated at 52 and having one terminal 61 set in the longer pendulum 55, while the other terminal of said circuit is connected to both contact members 62, 62, carried by the shorter pendulum 53 and located on either side of 61. The longer pendulum 55 is suspended from pivot 55a in a fixed housing 69 and the shorter pendulum 53 is suspended from pivot 54 set in the slotted frame 55b of the longer pendulum 55. A double acting dash-pot is provided for damping any movement of the longer pendulum 55 and this may comprise a cylinder 63 containing a body of viscous liquid 68 in which piston 64, having the small by-pass opening 67, is immersed, said cylinder 63 being mounted on a fixed base and said piston being connected by piston rod 66 to the bell crank arm 65 projecting from pendulum 55.

Also such damping action may be produced by placing a projecting fin or paddle 124 on the lower end of pendulum 55 and immersing that in another body of viscous liquid 126 which is carried in a narrow trough 127 traversed by said paddle whenever the pendulum 55 oscillates, all as indicated in Fig. 5a.

The operation of this species of apparatus is as follows: The longer pendulum 55 is so retarded in its oscillations by the dash-pot or trough-and-paddle apparatus above described that when the car is suddenly started or accelerated in movement the shorter pendulum 52 will quickly swing far enough and fast enough to close contact between 61 and one of its contact members 62, energizing solenoid 59, and close bleed port 18 and hold it closed until the parts come to equilibrium in or near mid position shown in Fig. 4. Whenever the car goes up or down grade the long pendulum 55 will slowly swing on its pivot 55a and readjust itself in vertical position, but the shorter pendulum 53 will also similarly readjust itself and the motion of both will be so slow, as the grade of the road slowly changes, that no contact between 61 and 62 will occur as the result of said change of grade. Again, it may be noted that any temporary engagement of the contacts while the car is running and the clutch fully engaged, is immaterial, but after both pendulums have readjusted themselves to the inclined positions, and the car is stopped on a grade, the normal bleed-closing action will be effected when it is started, and when gears are stepped up in getting it going at full speed on the grade.

In Figs. 6 and 7 another form of pendulum operated valve is shown in which a plug valve rotating on its axis is substituted for the poppet valve heretofore described. In said figures of drawings 71 is a pipe fitting or nipple screwed into the wall of the coiled portion 19 of pipe 11 and 74 is a cylindrical plug fitting tightly in said nipple and having its inner end peened over at 75 to prevent its being pulled out. A through passage 72 is then bored diametrically through plug 74 and fitting 71 and plug 74 is also centrally bored as shown at 76 to communicate with passage 72. Pendulum 73 is then hung on the projecting portion of plug 74 and clamped thereto by setscrew 77 in such position that when the pendulum hangs vertically the through passage 72 is open to the atmosphere, and air may enter the pipe coil 19, but if pendulum 73 is swung to either side plug 74 turns with it and passage 72 is gradually closed off, and the bleed action terminated.

As the inertia of any loosely mounted mass may be substituted for that of a pendulum to actuate the bleed valve in the general manner heretofore indicated in Fig. 3a, a convenient form of such floating mass is a spring driven fly wheel such as shown at 83 in Fig. 8. Such a fly wheel mechanism develops an unexpected advantage in that, as its motion is one of rotation instead of translation, it may be geared directly to the transmission shaft, or to the clutch plate shaft, and so responds to variations in the revolutions thereof even before those variations have been transmitted to the traction wheels. Consequently it is the most sensitive and promptly responsive form of "motion lag" device I have been able to so far develop. If such fly wheel is loosely journaled and spring-driven from any point in the line of power transmission gearing, deformation of the spring will be caused by the varying degrees of torque to which it is subjected as the motion of the car begins or is sharply increased or decreased. Consequently relative motion between parts so caused may be employed to operate the valve controlling the bleed to or from the servo-motor. One form of such apparatus tis diagrammatically illustrated in Fig. 8 where the servo-motor cylinder 6 has a direct bleed connection by pipe 88a, to the interior of valve casing 80, and said bleed connection may be closed by motion of the piston valve 80a to the right, thereby closing the air inlet port 88. A small leakage port 119 may be bored through the wall of pipe 88a. Link 90 connects valve 80a to lever 87 which has a fixed pivot 89 and a fork on its free end engaging groove 92 in the worm sleeve 82 on which fly wheel 83 is fastened. 86 is an anchoring ring fast on the worm shaft 81 and 85 is a torsion spring anchored to ring 86 at one end and to sleeve 82 at the other. 81 is a projecting portion of the spiral gear shaft by which the speedometer and odometer are usually driven. It projects from gear box 102, and such spiral gearing is indicated at 91.

When the car is moving at a uniform speed torsion spring 85 will only be slightly flexed to the extent necessary to overcome the friction of the air on fly wheel 83, but, if the car is suddenly accelerated or started into movement from a condition of rest, the inertia of fly wheel 83 will cause it to lag behind the increased speed of revolution of worm shaft 81, thereby shifting sleeve 82 longitudinally along the worm shaft until the increased torque flexure of spring 85 has overcome this inertia and gradually speeded up the fly wheel 83 to synchronism with the worm shaft 81. The relative movement of translation of sleeve 82 with reference to fixed point 89 then caused by the slight relative revolution of worm shaft 81 in said sleeve, will oscillate lever 87 and move valve 80a in one direction or the other sufficiently to partly or wholly close off the bleed connection 88a, with the result of arresting wholly or partly the clutch closing movement of piston 5 temporarily, in the manner hereinbefore described.

The valve portion of the above outlined apparatus may be combined with the fly wheel mechanism, as indicated in Fig. 8a, where the two rings 180, 180, sliding on an extension of shaft 81 take the place of the valve casing 80, and said shaft extension is turned into a valve by the axial and radial borings 180a cooperating with the said rings, as valve 80a did with casing 80. It only remains to connect bleed pipe 88a, and this can be done by any desired form of revoluble joint. Such joint, as indicated in Fig. 8a, comprises a muff coupling member 89 connected to 88a, and a graphite, combined-packing-and-lubricating ring 90 seated on flange 192 near the end of shaft 81. The opposite annular bearing for ring 90 is formed by ring 94 on or near the end of coupling member 89. Suction from the bleed pipe will hold the parts in contact when contact is needed to prevent leakage. At other times ring 90 is freed from pressure and consequent wear. Rings 180, 180, may be connected to fly wheel sleeve 82 by spring fingers 195, 195, engaging indentations 196, 196, on the rings, so the latter may be adjusted toward or from 82, or any other desired adjustable connection may be employed.

The fly wheel type of inertia apparatus works equally well whether the car is on a level or on a grade, whether in the middle of the road or with its wheels on one side down in a ditch, so that no compensating mechanism, such as illustrated in Figs. 4 to 7 is required.

The pendulum type of inertia devices hereinbefore described are all subject to one minor fault in that their action on the valve cannot occur until an appreciable interval of time has elapsed after the gradually increased degree of contact of the clutch plates and the increasing friction between them, have begun to move the car from a position of rest, or to accelerate its motion after a change of gears. This minor fault is eliminated or reduced to a minimum by the second and third forms of the embodiments of my invention, the latter being illustrated in Figs. 8, 9 and 10.

As in the fly wheel type the valve is operated quite independently of any motion of the car, and it will operate as quickly and fully if the car be suspended free, or partly free, of the ground, as when run on a brake test.

In the third type now to be described the inertia of the car body, motor and chassis and parts carried thereby, is employed to actuate the valve the instant the motor torque, or any sharp increase thereof, is applied to the driving shaft or axle of the car, so that the moment the clutch plates engage sufficiently to transmit torque or any increase thereof to the driving axle the bleed valve is closed simultaneously with the movement or increased movement of other portions (the traction creating parts) of the car. One form of mechanism embodying this modification of the invention is illustrated in Fig. 9 and comprises a simple cable or rod 96 connected at one end by screw hook 99 to the lower surface of the differential casing 105 and at its other end connected by pin 95 to a strong spring 97 anchored to any fixed portion 98 of the chassis or motor casing. The double acting valve 36, 36 is then again operated to close the bleed opening 32 in pipe 11, being carried by the bent lever 36a oscillating, as a bellcrank, on a fixed pivot 93 and having its shorter arm connected by link 94 to pin 95. The other parts of the car outlined in this figure comprise the chassis 100, the motor 101, gear case 102, fly wheel 103, transmission shaft 104, floating axle 107, axle housing 106 and the U-clips 108 fastening the axle housing 106 to the springs 109 which are pivoted to the chassis at 110 and to the spring shackles 111 at their other, rear ends in the usual manner. Whenever the clutch is thrown into engagement and the axle 107 is started into rotation in a counterclockwise direction to drive the car ahead, the axle housing and differential housing are immediately subjected to a sudden and equally powerful torque (by the reaction) in the opposite, or clockwise, direction and the springs 109 flex slightly to permit a slight turning movement of the differential casing, accordingly. This causes cable 96 to slightly relieve the tension on the spring 97, which thereupon contracts and gives valve lever 36a a slight rotation about its pivot 93 in a clockwise direction sufficient to close the bleed port 32. When the reverse gear is in mesh and the car is backed up, a reverse action occurs and valve lever 36a is slightly swung in a counterclockwise direction, thereby causing the other valve head 36 to again close port 32. The valve lever 36a may be made light enough to flex slightly if excessive motion of the differential casing is more than sufficient to close valve 36.

In Fig. 10 the inertia of the car itself may similarly operate to actuate the bleed valve through the "floating power" mounting, now coming into use. In this figure 101 again represents the motor casing which is supported by feet 112, 112, resting on rubber springs 114, 114, supported on lugs 113, 113, bolted to the chassis 100. Bolts 115, 115, passing through holes in feet 112 and in lugs 113, in which they fit loosely, limit the upward motion of either side of the motor under the torque strains. When my invention is applied to this conventional type of "floating power" apparatus, the double valve 36, controlling the bleed opening 32, may be connected directly to the free end of a fairly stiff leaf spring 116, which has its other end clamped to the motor casing by the screw 117. When the car is at rest, or the motor is disconnected from the transmission by disengagement of the clutch, the rubber springs or pads, 114, 114, are equally compressed and the spring 116 is so adjusted that the bleed valve heads 36, 36, are both some distance from the bleed port 32. The instant the clutch is thrown into engagement, however, an initial contact between the plates thereof occurs, the reaction of the torque applied to the rear axle causes the floating motor to twist slightly in one direction or the other, according to the gear in mesh, if the gear box is a part of the motor casing as is now customary. This compresses one or the other of the rubber pads 114, 114, lowers or raises the valve, and closes bleed opening 32. If the motion of the motor casing continues after the valve is closed, the spring 116 flexes, and breakage of the parts is thereby avoided.

Both of the forms of apparatus shown in Figs. 9 and 10 also operate equally well whether the car is resting on a level road or on a grade.

Among the advantages resulting from the use of my invention the following may be pointed out: When used as a supplement to another "two-stage" mechanism it automatically synchronizes the inception of the second, slower stage of clutch closing movements with the moment of sufficiently close clutch engagement to start or accelerate, the car; which is the moment this should be done. This result follows from the fact that the bleed closure is incited by such clutch closure itself. Consequently there is avoided most of the recurrent necessities for readjusting the length of piston rod 4, connecting piston 5 to lever 1, to compensate for progressive wear of the clutch parts or pivot connections thereto which arise when an ordinary two-stage mechanism is used alone. The action of all forms of the present invention is also automatically self-adjusting to conform to the degree of acceleration given to the car, because the action of the bleed closure is more prompt and complete and more prolonged when the car is sharply accelerated, as in starting from rest, or in going from first to second gear, than when less accelerated, as when going from second to third, or direct drive gear. Consequently the full clutch closure is correspondingly delayed in direct proportion to the sharpness of acceleration, and the increased liability to resultant clutch grabbing and jumping, and jerking of the car, is thereby avoided. Under slight acceleration, on the other hand, the initiation of the bleed closure is delayed, or the valve closure may not be quite completed and, if completed, soon ended, so that complete clutch closure occurs more promptly, which is then permissible, and slipping and consequent wear of the clutch faces to that extent reduced, when not a necessary evil intentionally incured to avoid the more objectionable straining of the transmission parts and jolting of the car occupants in cases of sharp acceleration. The method of actuating the bleed valve by traction torque-produced, relative motion of portions of the car itself, such as shown in Figs. 9 and 10, are most advantageous because of their parctically instantaneous action the moment clutch contact occurs. This action occurs almost as promptly as in the case of the fly wheel form shown in Fig. 8. Also in the torque operated forms the forces called upon for their operation are powerful, and never failing, and the valve mechanisms operated by them may consequently be very rugged and even heavy in construction. In the pendulum actuated methods shown in Figs. 1 to 7 the action on the bleed valve is secondary, in the sense that the mass of the whole car must be put into motion, or a definite degree of acceleration of its motion must have been accomplished, before the lag of the pendulum becomes effective to close the bleed, but in Figs. 9 and 10 no such lag and consequent delay is needed. The valve closes before the car body and chassis are moved or accelerated.

Another advantage results from the fact that although when coasting in any gear, forward or reverse, with a car equipped with automatic clutch control of the type shown in Fig. 1, if the accelerator is depressed to speed up the engine the clutch engages before the engine speed has come up to synchronism with the clutch disc, and consequently a disagreeably sudden, but temporary, braking effect is felt by the car occupants, this effect is eliminated by the double-acting, inertia operated valve of my present invention which checks the clutch engagement as soon as a slight deceleration starts, and this allows the clutch to slip until the engine has reached synchronism with the clutch disc. Consequently the lagging motor is picked up without shock to the mechanism. This results from the fact that the bleed opening closes (if the motor is running) whenever a sufficiently close contact between the clutch parts occurs, whether the motor is running faster than the car, or vice versa.

Various changes could be made in the various details of construction here illustrated and hereinbefore described without departing from the underlying principle of the invention, so long as the inertia of some mass on, or in the car is the energizing factor, serving to arrest or slow down the rate of clutch closure at or about the time the clutch plates come in contact. Other forms of valves, and of valve operating mechanism may be substituted for those shown in the various embodiments of the invention here suggested, and equally good results would be obtained if the worm shaft 81 in Figs. 8 and 8a were geared to some element of the transmission line from motor to wheels other than the power transmission shaft 112, as is now shown in Fig. 8.

Having described my invention, I claim:

1. The combination, with a power-operated apparatus for actuating the clutch controlling member of a motor car, of mechanism for modifying the operation of said apparatus brought into action by the inertia of a mass yieldingly connected to the traction producing portions of the car; whereby, on starting the car or sharply increasing its speed of motion, a lag in the movement of said mass relative to other parts of the car energizes said mechanism.

2. The combination, with a power-operated apparatus for actuating the clutch controlling member of a motor car and means for producing a relatively slow final stage of clutch closing movement of said member, of automatic mechanism responsive to any change in the relative rates of movement of the car and of an element of said mechanism for practically arresting, temporarily, all movement of said member substantially at the inception of said final stage thereof.

3. The combination, with a power-operated apparatus for actuating the clutch controlling member of a motor car and means for producing a relatively slow final stage of clutch closing movement of said member, of automatic mechanism responsive to any change in the relative rates of movement of the car and of an element of said mechanism for practically arresting, temporarily, all movement of said member substantially at the inception of said final stage thereof, said mechanism comprising a device actuating said mechanism immediately upon the occurrence of sufficiently strong contact between the clutch members to start the car or materially accelerate its motion.

4. The combination, with a power-operated apparatus for actuating the clutch controlling member of a motor car and means for producing a relatively slow final stage of clutch closing movement of said member, of automatic mechanism for practically arresting temporarily said movement substantially at the inception of said final stage thereof, said mechanism comprising a device energized by the inertia of part of said motor car having a yielding connection to another part thereof.

5. The combination, with a pneumatic servomotor for actuating the clutch controlling member of a motor car, and a valve for controlling the flow of air for operating said servo-motor, of mechanism operative by virtue of the inertia of an element thereof to move said valve toward closed position whenever such car starts to move, or has its motion materially accelerated.

6. A combination such as defined in claim 5 in which said mechanism includes, as elements thereof, a mass yieldingly supported with reference to the traction wheels of the car and an operative connection from said mass to said valve.

7. In a power-operated, clutch-actuating mechanism for a motor car comprising means for automatically producing a relatively rapid initial stage of movement of clutch closure and a retarded final stage of such movement, the combination, with said above described apparatus, of automatic mechanism operative by virtue of the inertia of an element thereof for practically arresting temporarily said clutch closing movement at substantially the instant when the car begins to move, or has its motion materially accelerated.

8. The combination of a pneumatic servo-motor controlling the clutch of a motor car, an automatic apparatus controlling in part the flow of air for said servo-motor so as to produce two stages of clutch closing movement thereof having different speeds, a bleed connection to the air space in said servo-motor, and a valve controlling said connection automatically movable toward closed position whenever a closure of such clutch, sufficient to start the car in motion, occurs; whereby the clutch closing movement is practically arrested temporarily at said moment.

9. The combination of a pneumatic servo-motor controlling the clutch of a motor car, an automatic apparatus controlling in part the flow of air for said servo-motor so as to produce two stages of clutch closing movement thereof having different speeds, a bleed connection also controlling in part said flow of air, and a valve controlling said bleed connection, together with a mass yieldingly supported on the running gear of the car, and connections from said mass to said valve operative to move said valve toward closed position whenever the conditions as to motion of said car are sharply modified.

10. The combination with a motor car and automatic clutch-controlling mechanism therefor, of a pendulum suspended on the car so as to swing longitudinally thereof, means, controlling in part the operation of the clutch-controlling mechanism, operatively connected to the pendulum; whereby on starting the car into motion or suddenly accelerating or decelerating the car motion, the consequent oscillation of the pendulum will modify the action of the clutch-controlling mechanism, and a device for automatically adjusting parts of said mechanism co-operating with said pendulum, so that its accuracy of action will not be impaired when the car is ascending or descending a grade, however steep.

11. The combination with a motor car, a pendulum suspended therefrom and a valve, of mechanism operatively connecting said pendulum and valve comprising a fluid chamber having a fine leakage port in its wall, and two flexible diaphragms also set in said walls, one of which diaphragms is connected to said pendulum and the other to said valve; whereby portions of fluid may slowly enter or leave said chamber through said leakage port without moving said valve as the diaphragm connected to said pendulum is slowly flexed when the car goes from a level to an incline or vice versa, but cannot move through said port quickly enough to prevent said valve operating diaphragm being sharply flexed coincidentally with any sudden oscillation of said pendulum resulting from starting, acceleration or deceleration of the car.

12. The combination, with a power-operated device for actuating the clutch of a motor car comprising a pneumatic servo-motor having a bleed connection and a valve for controlling said bleed connection, of a fly wheel loosely journalled on such car and spring means for driving said fly wheel from some portion of the power transmission gearing thereof, together with means operated by any lag in the rotation of said fly wheel relative to that of said gearing for operating said valve.

13. A combination such as defined in claim 12 in which said flywheel has a worm-geared mounting on the speedometer operating shaft of the motor car, and a spiral spring which surrounds and has one end anchored to said shaft and its other end anchored to said flywheel; whereby any lagging in, or changes in speed of revolution of said flywheel relative to that of said speedometer actuating shaft will produce an endwise shifting of said worm gear parts which will produce the desired valve operation.

14. The combination, with a motor car having a power-operated device for actuating its clutch-controlling member, and a slightly yielding mounting for a portion of its traction producing apparatus, of means for checking the clutch closing movement of said member temporarily whenever a sharp variation in the traction torque produces an appreciable shift in the position of said yieldingly mounted traction producing apparatus relative to the car chassis.

15. The combination, with a motor car having a spring supported driving axle housing, and power operated mechanism for actuating its clutch, of a mechanism for controlling said clutch actuating mechanism operatively connected to said axle housing; whereby, whenever a sufficiently complete closure of said clutch causes said spring mounting to yield, and said axle housing to rotate slightly by torque reaction, the operation of said clutch controlling mechanism will be modified.

16. The combination, with a motor car having a pneumatic servo-motor for operating its power transmission clutch, of a bleed valve for said servo motor, and means for moving said valve toward closed position operated by any sudden changes in the rear axle torque of the car.

17. An automotive vehicle comprising a clutch, a gaseous fluid operated motor for controlling the engagement and disengagement of the clutch, means for controlling the gaseous pressure within said motor to provide two distinct stages of movement of the clutch during its clutch engaging operation, and means, operable according to the rate of change of speed of the vehicle, for controlling the last stage of clutch engaging movement.

18. In apparatus of the type described, the combination with a clutch including normally engaged driving and driven elements, a lever to control the speed of the driving element, means under control of the lever for disengaging the clutch elements and inertia means responsive to variations in the speed of the driven element of the clutch for controlling the rate of re-engagement of the clutch elements.

19. In apparatus of the type described, the combination with a clutch including normally engaged driving and driven elements, a shiftable lever to control the speed of the driving element, a fluid motor under control of said lever for disengaging the clutch elements and inertia means responsive to variations in speed of the driven element of the clutch for controlling the rate of reengagement of the clutch elements.

20. The combination, with a fluid pressure servo-motor for actuating the clutch controlling member of a motor car, and a valve for regulating the operation of said servo-motor, of mechanism operative by virtue of the inertia of an element thereof to operate said valve whenever such car materially accelerates in either direction.

HENRY J. De N. McCOLLUM.